Patented Apr. 7, 1942

2,278,961

UNITED STATES PATENT OFFICE 2,278,961

TRIARYLMETHANE DYESTUFFS AND PROCESS OF PREPARING THEM

Paul Herbert Wolff, deceased, late of Frankfort-on-the-Main-Hochst, Germany, by Richard Wenzel, administrator, Frankfort - on - the-Main-Hochst, Germany, and Karl Frank, Frankfort-on-the-Main-Hochst, Germany, assignors to General Aniline & Film Corporation, a corporation of Delaware No Drawing. Application December 21, 1938, Serial No. 247,051. In Germany April 30, 1938

8 Claims. (Cl. 260—394)

The present invention relates to triarylmethane dyestuffs and to a process of preparing them.

We have found that very valuable dyestuffs of the triarylmethane series, which may be transformed in substance or on the fiber into their complex metal compounds, can be made by condensing 3-hydroxy-4-carboxybenzaldehyde with a secondary or tertiary aromatic amine of the benzene series which may contain substituents such as for instance methyl-, hydroxy- or sulfo groups, or with an aromatic orthohydroxycarboxylic acid of the benzene series, then sulfonating the condensation product thus obtained in case it does not already contain a sulfonic acid group, and oxidizing the leuco-compound so obtained so as to form the dyestuff.

The present invention comprises new dyestuffs, for instance those of the general formula:

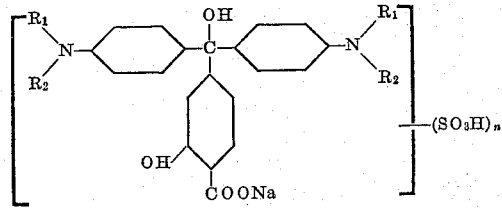

wherein $R_1$ means a member of the group consisting of hydrogen, alkyl groups and substituted alkyl groups, $R_2$ means a member of the group consisting of alkyl groups and substituted alkyl groups and $n$ is a number selected from the group consisting of 1 and 2.

In German specification No. 654,573 there are described dyestuffs of the triarylmethane series capable of being converted into complex metal compounds which are likewise derived from aldehydes of aromatic ortho-hydroxycarboxylic acids, but exclusively from those acids in which the aldehyde group is in meta-position to the carboxylic acid group.

From these dyestuffs the dyestuffs of the present invention are fundamentally different.

The new and hitherto unknown position of the aldehyde group in the aromatic ortho-hydroxy-caroxylic-acid used in the present invention results in a considerale improvement which depends on the fact that in the complex metal compounds of the resulting dyestuffs the hydroxyl group, present in meta-position to the methane carbon atom, no longer acts as an auxochrome, as is the case with the dyestuffs described in the aforesaid specification. The considerable displacement which the shade of the dyestuff free from metal otherwise undergoes on formation of the metal complex (for instance from green to blue) is thereby prevented and it is possible, for instance, to obtain green triarylmethane dyestuffs which can be converted into complex metal compounds which are likewise green.

The hitherto unknown 3-hydroxy-4-carboxy-benzaldehyde used in the present invention may be obtained, for instance, by reducing 4-nitro-2-hydroxy-benzoic acid ethyl ester to form the 4-amino-2-hydroxybenzoic acid ethyl ester, transforming the latter by known methods into the 4-cyano-2-hydroxybenzoic acid ethyl ester, converting the cyano group according to Stephen (Journ. Chem. Soc. vol. 127, page 1874) and saponifying the ester so obtained.

The following examples serve to illustrate the invention, but they are not intended to limit it thereto; the parts are by weight:

(1) 166 parts of 3-hydroxy-4-carboxybenzaldehyde and 298 parts of diethylaniline are added to 2000 parts of sulfuric acid of 5 per cent strength and the whole is boiled until the aldehyde is consumed. After cooling and neutralizing the acid by means of sodium carbonate, the leuco-compound which separates is isolated by filtering with suction, washed, dried and sulfonated in the course of 10 to 15 hours in 8 times its weight of fuming sulfuric acid containing 15 per cent of sulfuric anhydride at a temperature of 10° C. The mono-sulfonic acid thus obtained is isolated in the usual manner and separated from the sulfuric acid. It may be oxidized, in the form of its mono-sodium salt, in an aqueous solution, by means of lead dioxide to form a dyestuff which is isolated as a sodium salt and dyes wool in an acid bath clear bluish-green tints whose fastness properties are considerably enhanced by after-chroming, without change in the shade.

(2) 166 parts of 3-hydroxy-4-carboxybenzaldehyde and 382 parts of n-butyl-ethyl-meta-toluidine are added to 2000 parts of sulfuric acid of 5 per cent strength and the whole is heated until the aldehyde is consumed. The leuco-compound thus obtained is isolated in the manner indicated in Example 1 and sulfonated in the course of 12 to 18 hours in 8 times its weight of fuming sulfuric acid containing 36 per cent of sulfuric anhydride at a temperature of 20° C. to 25° C., so as to obtain the mono-sulfonic acid. The sulfonic acid is isolated by pouring on ice and the dyestuff is obtained therefrom in a manner analogous to that described in Example 1 by oxidation with lead dioxide in an acid solution. It dyes wool in an acid bath very clear yellowish-green tints which on after-chroming become very fast to washing and to light, without change in the shade.

(3) 166 parts of 3-hydroxy-4-carboxybenzaldehyde and 326 parts of n-butyl-ortho-toluidine are heated in dilute sulfuric acid in the manner indicated in Example 1 until the aldehyde is consumed. The leuco-compound isolated in the manner described in that example is sulfonated in the course of 20 hours in 8 times its weight of fuming sulfuric acid containing 25 per cent of sulfuric anhydride at a temperature of 20° C. to 25° C. to form the corresponding mono-sulfonic acid. By oxidizing the latter in an acid solution with lead dioxide, as described in Example 1, a dyestuff is obtained which dyes wool in an acid bath blue tints whose fastness properties are essentially enhanced on after-chroming without displacement of the shade.

(4) 166 parts of 3-hydroxy-4-carboxybenzaldehyde and 458 parts of N-ethyl-N-phenylamino-ethane-omega-sulfonic acid are added to 6500 parts of water and the whole is boiled in a reflux apparatus until the aldehyde is consumed. By oxidizing this solution by means of lead dioxide, eliminating the lead compound and evaporating to dryness a dyestuff is obtained which dyes wool in an acid bath green tints whose fastness to washing and to light is distinctly enhanced by conversion into the chromium lake without change in the shade.

(5) If in example 4 the N-ethyl-N-phenyl-amino-ethane-omega-sulfonic acid is replaced by 582 parts of N-ethyl-N-phenylaminobenzyl-3-sulfonic acid of the following constitution:

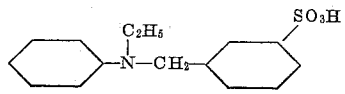

and the procedure is otherwise as described in Example 4, there is obtained by salting out a dyestuff which dyes wool in an acid bath green tints which on after-chroming become faster whilst retaining the shade.

(6) 166 parts of 3-hydroxy-4-carboxybenzaldehyde and 330 parts of meta-diethylaminophenol are added to 2000 parts of sulfuric acid of 5 per cent strength and the whole is boiled until the aldehyde is consumed. The leuco-compound is isolated and dried in the usual manner and then sulfonated in the course of 30 to 40 hours at a temperature of about 20° C. in 8 times its weight of fuming sulfuric acid containing 15 per cent of sulfuric anhydride to form the mono-sulfonic acid. The solution is adjusted to a concentration of 90 per cent of sulfuric acid by means of ice and ring-closure to the pyrone is caused by heating the whole at a temperature of 110° C. to 115° C. for 7 hours. The pyrone compound is isolated by salting out and then oxidized in a boiling acid solution by means of ferric chloride. The dyestuff is salted out by means of sodium chloride, then dissolved in a sodium carbonate solution and isolated by evaporating the filtered neutral solution. It dyes wool in an acid bath bright bluish-pink tints whose fastness properties are essentially enhanced by after-chroming without change in the shade.

(7) 166 parts of 3-hydroxy-4-carboxybenzaldehyde are mixed with 304 parts of ortho-cresotinic acid (COOH:OH:CH$_3$=1:2:3) and heated for two hours in 2200 parts of sulfuric acid of 66° Bé, at a temperature of about 35° C. 70 parts of sodium nitrite are then added in small portions to the clear solution, whilst stirring, and stirring is continued for 24 hours at about 20° C.; the whole is then further heated for one hour at 60° C. and the dyestuff is isolated by pouring the solution on to ice. It dyes wool in an acid bath followed by after-chroming blue tints having very good fastness properties.

We claim:

1. The process which comprises condensing 3-hydroxy-4-carboxybenzaldehyde with a compound of the group consisting of secondary and tertiary amines of the benzene series by heating the reagents in the presence of water, sulfonating the product in case it does not contain a sulfonic acid group, and oxidizing the leuco-compound obtained to the dyestuff.

2. The process which comprises condensing 3-hydroxy-4-carboxybenzaldehyde with diethylaniline by boiling the reagents in the presence of aqueous sulfuric acid of 5 per cent strength, sulfonating the product to the monosulfonic acid and oxidizing the leuco-compound obtained to the dyestuff.

3. The process which comprises condensing 3-hydroxy-4-carboxybenzaldehyde with n-butyl-o-toluidine by boiling the reagents in the presence of aqueous sulfuric acid of 5 per cent strength, sulfonating the product to the monosulfonic acid and oxidizing the leuco-compound obtained to the dyestuff.

4. The process which comprises condensing 3-hydroxy-4-carboxybenzaldehyde with N-ethyl-N-phenylaminobenzyl-3-sulfonic acid by boiling the reagents in the presence of water, and oxidizing the leuco-compound obtained to the dyestuff.

5. The compounds of the general formula:

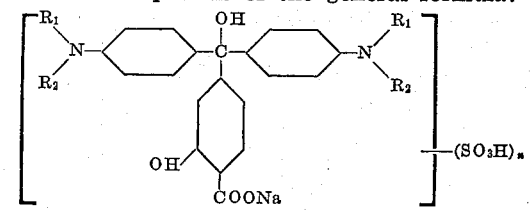

wherein R$_1$ means a member of the group consisting of hydrogen, alkyl groups and substituted alkyl groups, R$_2$ means a member of the group consisting of alkyl groups and substituted alkyl groups and $n$ is a number selected from the group consisting of 1 and 2.

6. The compound of the following formula:

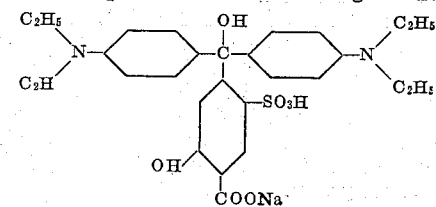

being a dyestuff which dyes wool in an acid bath clear bluish-green tints whose fastness properties are considerably enhanced by after-chroming without change in the shade.

7. The compound of the following formula:

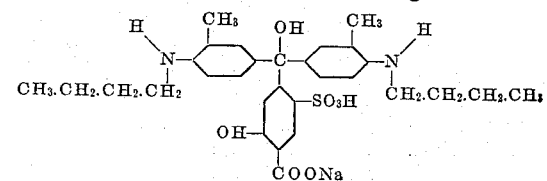

being a dyestuff which dyes wool in an acid bath blue tints whose fastness properties are essentially enhanced on after-chroming without displacement of the shade.
8. The compound of the following formula:
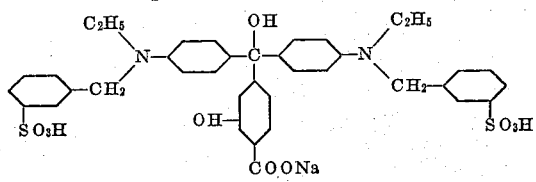
being a dyestuff which dyes wool in an acid bath green tints which on after-chroming become faster whilst retaining the shade.
RICHARD WENZEL,
*Administrator of Paul Herbert Wolff, Deceased.*
KARL FRANK.